United States Patent [19]
Penno et al.

[11] 3,725,088
[45] Apr. 3, 1973

[54] COMPOSITION FOR WATERPROOFING CONCRETE AND AGGREGATE AND IMPROVING BONDING AND STRENGTH OF AGGREGATE

[76] Inventors: Edward Penno; Mary Penno; Athol Currie Wright, all of P.O. Box 278, Nakusp, British Columbia, Canada

[22] Filed: June 29, 1971

[21] Appl. No.: 158,057

[52] U.S. Cl..................................102/12, 106/315
[51] Int. Cl. ...............................................C09k 3/00
[58] Field of Search......................106/12, 314, 315

[56] References Cited

UNITED STATES PATENTS

| | | | |
|---|---|---|---|
| 1,494 | 11/1870 | Ximenes et al. | 106/12 |
| 1,319,178 | 11/1919 | Reusz et al. | 106/12 |
| 1,495,138 | 5/1924 | Downes | 106/12 |

*Primary Examiner*—Joan B. Evans
*Attorney*—Watson, Cole, Grindle & Watson

[57] ABSTRACT

This invention relates to the composition for waterproofing concrete and aggregate and for improving the bonding and strength of aggregate. The composition is largely composed of an aqueous solution of calcium chloride, $CaCl_2$, and water in the approximate proportions of 1:4, admixed with an aluminum sulphate, $Al_2(SO_4)_3 \cdot 18H_2O$ water solution, a copper II sulphate $CuSO_4 \cdot 5H_2O$ and water solution, and a caustic potash KOH, and water solution admixed with the aforesaid calcium chloride solution in the order mentioned. The total proportion is approximately calcium chloride, $CaCl_2$, 20 percent, aluminum sulphate, $Al_2(SO_4)_3 \cdot 18H_2O$, 1.2 percent copper II sulphate, $CuSO_4 \cdot 5H_2O$, 0.6 percent, caustic potash KOH, 1.0 percent and the remainder about 78 percent water. The commercial flake calcium chloride contains from approximately 77 percent to approximately 80 percent calcium chloride, the balance being largely water of crystallization. This calcium chloride also contains approximately 0.5 percent sodium chromate $Na_2CrO_4$. The flake calcium chloride also contains about 0.1 percent calcium hydroxide $Ca(OH)_2$ (which gives slight alkalinity to the chromate treated calcium chloride solution). The flake calcium chloride also contains a maximum of 2 percent sodium chloride NaCl and much less than 0.5 percent magnesium chloride $MgCl_2$.

2 Claims, No Drawings

COMPOSITION FOR WATERPROOFING CONCRETE AND AGGREGATE AND IMPROVING BONDING AND STRENGTH OF AGGREGATE

This invention relates to a formulation useful in waterproofing concrete and aggregate for other purposes to be more fully discussed below.

Concrete is one of the most widely used building materials of all time and its use has increased at a rapid rate in recent years. As is well known concrete is commonly made by mixing portland cement with sand and an aggregate of suitable size with water and allowing the material to set. The setting of the concrete is a rather complex process involving the decomposition of certain substances in the portland cement and the formation of certain others.

Good concrete is generally practically waterproof and in general reasonable amounts of water deposited on the concrete floor or other surface do not seep through to the space below. At the same time, it has been found that if concrete is continuously wet, a certain amount of water will frequently seep through to the underside of the concrete. For example where there is a swimming pool elevated from the ground such as on a higher floor of a building, or where there is a car-washing bay of a garage or service station, it will frequently be found that water will find its way through to the lower surface of the concrete and for this reason various waterproofing compounds have been developed.

It is an object of this invention to provide an improved substance for waterproofing concrete and also waterproofing aggregate.

A further object is to provide a substance which gives improved bonding strength of aggregate.

A further object is to prevent shrinkage of concrete.

It is also an object of the present invention to provide a substance which is useful in helping concrete resist both frost and heat.

A still further object is to provide a substance which is useful as a concrete patching compound.

Other objects and advantages will be apparent to one skilled in the art from a reading of the present disclosure and from the appended claims.

The method of making the composition which is the subject of this invention will now be described, during the course of which description the substances used will be disclosed and discussed. A preparation of the formulation will be described as used to make a resultant product in a quantity of approximately 1,650 pounds and it will be obvious that lesser or greater quantities can be made in a similar manner. The choice of the quantity mentioned has to do with conventionally available vats and the like and is in no way connected with the nature of the invention itself.

As applied to the making of approximately 1,650 pounds of formulation, 120 gallons of water, that is approximately 1,200 pounds, is placed in a copper vat having a capacity of approximately 200 gallons. The 120 gallons of water is heated to approximately 115° F. 318 pounds of calcium chloride $CaCl_2$ (admixed with about 0.5 percent by weight sodium chromate $Na_2CrO_4$ are then added to the heated water stirring the mixture vigorously and maintaining the heat.

Calcium chloride $CaCl_2$ is a very well known and easily available substance being found both in sea water and as a waste product in various chemical processes including the ammonia-soda process and apart from its use in removing ice from highways there is not too much demand for calcium chloride. Consequently this invention provides a use for a substance which is frequently surplus as an industrial product.

Continuing with the process, the temperature of the mixture to this point is brought up to approximately 160° F. at which point an aluminum sulphate $Al_2(SO_4)_3 \cdot 18H_2O$ solution in water is added. This latter solution in the proportions mentioned may be made by mixing approximately 20¼ pounds of aluminum sulphate in a dry container and adding thereto approximately 4 gallons of water and vigorously stirring the same and heating the same until it reaches a temperature of approximately 160°F. It will be seen that the solution of the "main" mixture and the added mixture are now the same and the aluminum sulphate solution is added to the main solution still stirring the same vigorously.

A second solution is now added being made up, in the proportions mentioned, of 10 pounds of copper II sulphate $CuSO_4 \cdot 5H_2O$ previously mixed up in a copper can with approximately four gallons of water and this second added solution is brought up to a temperature of 160°F. and like the first added solution, is in turn added to the main mixture. The second added solution just referred to is allowed to trickle slowly into the main mixture while vigorous stirring takes place.

A still further aqueous solution is now added which is made up of approximately 15¼ pounds of caustic potash KOH mixed up with cold water and again brought up to a temperature of 160° F. and again this third additive is run into the main solution with vigorous stirring taking place throughout.

After all these substances have been added the resultant product continues to be stirred vigorously and held at the aforesaid temperature of approximately 160° F. for a few minutes and it is then cooled and bottled.

It will be convenient to consider the aforesaid composition denoting the various component substances in percentage proportions. The 120 gallons or 1,200 pounds of water is approximately 73 percent by weight of the whole, the calcium chloride $CaCl_2$ with 0.5 percent by weight sodium chromate $Na_2CrO_4$ approximately 20 percent by weight, the aluminum sulphate $Al_2(SO_4)_3 \cdot 18H_2O$ approximately 1.2 percent by weight, the copper II sulphate $CuSO_4 \cdot 5H_2O$ approximately 0.6 percent by weight and the caustic potash KOH approximately 1 percent by weight.

The aforesaid 78 percent of water indicates the water initially present but it will be recalled that the aluminum sulphate $Al_2(SO_4)_3 \cdot 18H_2O$, copper II sulphate $CuSO_4 \cdot 5H_2O$ and caustic potash KOH each have water added thereto and so the total proportion of water ultimately in the mixture is in the order of 78 percent by weight.

The preferred composition has been given above, but it will be appreciated by a person skilled in chemistry that it is not necessary that the substance mentioned be used in precisely the proportions mentioned.

The calcium chloride $CaCl_2$ with approximately 0.5 percent sodium chromate $Na_2CrO_4$ making up approximately 20 percent of the composition may be present in an amount of approximately 18–22 percent by weight.

The sodium chromate in the calcium chloride may be present in a quantity of approximately 0.2 to 5 percent by weight. However, best results have been obtained when the amount of sodium chromate present in the calcium chloride is approximately 0.5 percent by weight.

Similarly the aluminum sulphate $Al_2(SO_4)_3 \cdot 18H_2O$ may be present in a quantity of approximately 1 percent to approximately 1.4 percent by weight.

The copper II sulphate $CuSO_4 \cdot 5H_2O$ may be present within the range of approximately 0.4 percent to approximately 0.8 percent by weight.

The caustic potash KOH may be present in a range of approximately 0.8 percent to approximately 1.2 percent by weight.

Perhaps the water present is the most variable amount of all the 78 percent figure given as the total quantity may vary all the way from approximately 70 percent to approximately 82 percent by weight.

Thus it will be seen that this formulation, although preferably made up in the proportions initially mentioned for efficiency in operation is still advantageous when the substances are within the ranges just referred to.

The use of the formulation herein disclosed will now be referred to. One way of using the formulation advantageously is to mix it in with concrete being made. In such a case the typical proportion would be three parts of gravel, two parts of sand, one part of cement and one-half pint of the formulation of the present invention for each bag of cement. The mix should be kept dry until it has set and should be tamped well into the form.

Another way of advantageously using the formulation of the present invention is to spread it on concrete which has already been poured and set. When the formulation is used in this manner, microscopic leaks are stopped, and the concrete rendered relatively waterproof.

It follows from the preceding paragraph that the substance of the present invention may be used for patching where cracks have occurred. Typical cracks in concrete will be hairline cracks such as are one-sixteenth inch or less in width, and generally no larger than will receive the point of a lead pencil. Such cracks are best repaired by using a mixture of five parts of water to one part of dry cement and one part of the formulation of the present invention as a patching material. This mixture will resemble thin cream and should be applied generously to the area where the crack has occurred. The mixture will run into the crack and will generally seal it permanently.

It is contemplated that the present invention may be offered for sale either in containers as mixed by the aforesaid process or alternatively as a patching material mixed with water and dry cement in the cream-like mixture just referred to.

It will be seen that the formulation of the present invention provides considerable advantages and is easy to work with and apply and will be useful not only for the large contractor but also for the individual user as well.

The embodiments of the invention in which an exclusive property or privilege is claimed are defined as follows:

1. A concrete improving composition comprising the following elements by weight:
    calcium chloride ($CaCl_2$) 18 to 22 percent and an admixture of sodium chromate ($NA_2CrO_4$) 0.2 to 5 percent, aluminum sulphate ($Al_2(SO_4)_3 \cdot 18H_2O$) 1.0 to 1.4 percent, copper II sulphate ($CuSO_4 5H_2O$) 0.4 to 0.8 percent, caustic potash (KOH) 0.8 to 1.2 percent, and the balance water.

2. A concrete improving composition as in claim 1 wherein said calcium chloride $CaCl_2$ is 20 percent, said sodium chromate is 0.5 percent, said aluminum sulphate is 1.2 percent, said copper II sulphate is 0.6 percent and said caustic potash is 1 percent.

* * * * *